United States Patent [19]

Kornacker

[11] Patent Number: 5,325,466
[45] Date of Patent: Jun. 28, 1994

[54] SYSTEM FOR EXTRACTING KNOWLEDGE OF TYPICALITY AND EXCEPTIONALITY FROM A DATABASE OF CASE RECORDS

[75] Inventor: Karl Kornacker, Columbus, Ohio

[73] Assignee: Perceptive Decision Systems, Inc., Columubs, Ohio

[21] Appl. No.: 880,051

[22] Filed: May 7, 1992

[51] Int. Cl.$^5$ ............................................. G06F 15/20
[52] U.S. Cl. ....................................... 395/77; 395/50; 395/75
[58] Field of Search ....................... 395/50, 75, 77, 17, 395/3, 10

[56] References Cited

U.S. PATENT DOCUMENTS

| | | | |
|---|---|---|---|
| 4,575,798 | 3/1986 | Lindstrom et al. | 364/300 |
| 4,620,286 | 10/1986 | Smith et al. | 364/513 |
| 4,631,664 | 12/1986 | Bachman | 364/200 |
| 4,719,571 | 1/1988 | Rissanen et al. | 364/300 |
| 4,853,843 | 8/1989 | Ecklund | 364/200 |
| 4,858,114 | 8/1989 | Heath et al. | 364/200 |
| 4,899,290 | 2/1990 | Hartzband | 364/513 |
| 4,918,621 | 4/1990 | Nado et al. | 364/513 |
| 5,224,206 | 6/1993 | Simoudis | 395/77 |
| 5,243,689 | 9/1993 | Yoshiura et al. | 395/77 |

OTHER PUBLICATIONS

Murtagh, Fionn D., "Cluster Analysis Using Proximities," Chapter 9, pp. 225-245, 1993.
Karnazes et al., "System Identification Techniques Using the Group Method of Data Handling", *Indentification and System Parameter Estimation*, 1982, vol. 1, pp. 713-718.
Stephen C.-Y. Lu et al., "A Machine Learning Approach to the Automatic Synthesis of Mechanistic Knowledge for Engineering Decision-Making", 1987, pp. 109-118.
M. R. Kanth et al., "Extending an Assumption Based Truth Maintenance System to Databases", 1988 IEEE, pp. 354-359.
Coputer Database Scan Printout.
Michalski et al., "Research In Machine Learning: Recent Progress, Classification of Methods, and Future Directions", *Machine Learning—An Artificial Intelligence Approach*, 1990, Chapter 1, pp. 3-30.
Michalski, "Learning Flexible Concepts: Fundamental Ideas and a Method Based on Two-Tiered Representation", *Machine Learning—An Artificial Intelligence Approach*, 1990, Chapter, 3, pp. 63-111.
Bareiss et al., "Photos: An Exemplar-Based Learning Apprentice", *Machine Learning—An Artificial Intelligence Approach*, 1990, Chapter 4, pp. 112-139.
Quinlan, "Probabilistic Decision Trees", *Machine Learning—An Artificial Intelligence Approach*, 1990, Chapter 5, pp. 140-152.
Falkenhainer et al., "Integrating Quantitative and Qualitative Discovery in the Abacus System", *Machine Learning—An Artificial Intelligence Approach*, 1990, Chapter, 6, pp. 153-190.
Hanson et al., "Conceptual Clustering and Categorization: Bridging the Gap between Induction and Causal Models", *Machine Learing—An Artificial Intelligence Approach*, 1990, Chapter 9, pp. 235-268.
Lebowitz, "The Utility of Similarity-Based Learning in a World Needing Explanation", *Machine Learning—An Artificial Intelligence Approach*, 1990, Chapter 15, pp. 399-432.
Kodratoff, "Learning Expert Knowledge by Improving the Explanations Provided by the System", *Machine Learning—An Artificial Intelligence Approach*, 1990, Chapter 16, pp. 433-473.

Primary Examiner—Allen R. MacDonald
Assistant Examiner—Tariq R. Hafz
Attorney, Agent, or Firm—Fay, Sharpe, Beall, Fagan, Minnich & McKee

[57] ABSTRACT

A knowledge tree building system iteratively partitions a database of case records into a tree of conceptually meaningful clusters. Each cluster is automatically assigned a unique conceptual meaning in accordance with its unique pattern of typicality and exceptionality within the knowledge tree; no prior domain-dependent knowledge is required. The system fully utilizes all available quantitative and qualitative case record data. Knowledge trees built by the system are particularly well suited for artificial intelligence applications such as pattern classification and nonmonotonic reasoning.

10 Claims, 5 Drawing Sheets

SYSTEM FOR EXTRACTING KNOWLEDGE OF TYPICALITY AND EXCEPTIONALITY FROM A DATABASE OF CASE RECORDS

BACKGROUND OF THE INVENTION

This application pertains to the art of machine learning, and more particularly to the art of extracting conceptually meaningful clusters from a database of case records by implementation of symbolic empirical learning.

The invention is particularly applicable to a system for iteratively partitioning a database of case records into a tree of conceptually meaningful clusters and will be described with particular reference thereto although it will be appreciated that the invention has broader applications such as learning to recognize meaningful patterns of similarities and dissimilarities within a grouping of examples.

Earlier systems for partitioning case records into clusters suffer from two severe limitations: first, earlier systems fail to provide sufficient means for fully utilizing all available quantitative and qualitative case record data; and second, earlier systems fail to provide sufficient means for extracting conceptually meaningful clusters in the absence of prior domain-dependent knowledge.

The present invention contemplates a new system that overcomes both of the above-referred limitations and provides a domain-independent system for extracting conceptually. meaningful clusters from any database of case records. The preferred implementation iteratively builds a tree of conceptually meaningful clusters, hereafter referred to as a knowledge tree, and automatically assigns a unique conceptual meaning to each cluster in accordance with its unique pattern of typicality and exceptionality within the knowledge tree. Knowledge trees built by the system are particularly well suited for artificial intelligence applications such as pattern classification and nonmonotonic reasoning.

SUMMARY OF THE INVENTION

In accordance with the subject invention, there is provided a system for partitioning a plurality of case records into conceptually meaningful clusters. Each case record contains data representative of the known values of at least one of a quantitative and a qualitative case record variable. Comparison means are employed to generate comparison signals representative of the distances between case records in accordance with all available case record data. Partitioning means are employed to partition the case records into conceptually meaningful clusters in accordance with the comparison signals.

In accordance with a more limited aspect of the invention, conceptually meaningful clusters formed by a previous partitioning are communicated in a feedback mode for subsequent analysis and repartitioning to build a knowledge tree.

An advantage of the present invention is the provision of a system for fully utilizing all available quantitative and qualitative case record data to partition a plurality of case records into conceptually meaningful clusters.

Yet another advantage of the present invention is the provision of a system for partitioning a plurality of case records into conceptually meaningful clusters in the absence of prior domain-dependent knowledge.

Yet a further advantage of the present invention is the provision of a system for iteratively partitioning a plurality of case records into a knowledge tree that is particularly well suited for artificial intelligence applications such as pattern classification and nonmonotonic reasoning.

Further advantages will become apparent to one of ordinary skill in the art upon a reading and understanding of the subject description.

BRIEF DESCRIPTION OF THE DRAWINGS

This invention may take physical form in certain parts and arrangements of parts, as well as the practice of certain steps, a preferred embodiment of which will be described in detail in this specification and illustrated in the accompanying drawings which form a part hereof and wherein.

DETAILED DESCRIPTION OF THE PREFERRED EMBODIMENT

Figure 1:
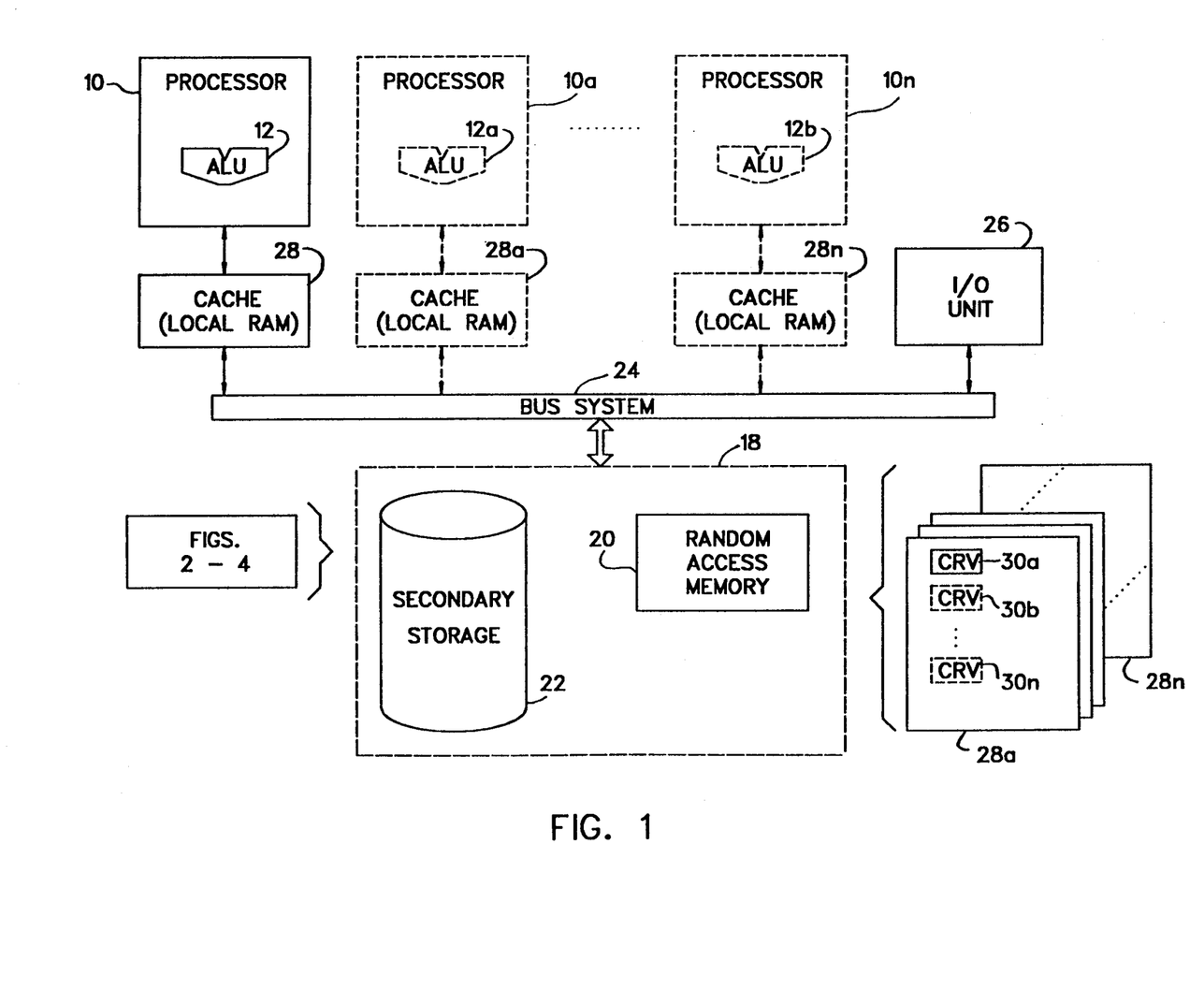
FIG. 1 illustrates a platform for accomplishing the knowledge extraction of the subject invention.

Referring now to the drawings wherein the showings are for the purposes of illustrating the preferred embodiment of the invention only, and not for the purposes of limiting the same, FIG. 1 illustrates a computer system A for accomplishing the knowledge extraction of the subject application. Included in the computer system A is a central processor unit ("CPU") or processor means 10. The CPU 10 is suitable formed from commonly available RISC or CISC devices. Included within the CPU 10 is an arithmetic and logical unit ("ALU") 12. The ALU 12 is particularly suited for logical and mathematical operations such as data comparison, partitioning, etc., as will be appreciated by one of ordinary skill in the art.

The computer system A also employs a virtual memory system 18 which includes relatively fast random access memory ("RAM") 20, as well as relatively slow, bulk secondary storage 22.

For reasons which will be understood furtherbelow, the subject system employs data parsing which is also advantageously practicable in a multi-processor environment. Such a multi-processor implementation is illustrated by the additional CPUs $10a$–$10n$, each of which includes an ALU$a$–$12n$ respectively. The one or more CPU units (hereinafter referred to as CPU 10) are suitably placed in data communication with virtual memory system 18 via a bus system 24. It is also advantageous to employ a relatively higher speed cache or local memory between CPU 10 and bus system 26. This is particularly advantageous in a multi-CPu environment where significant communication overhead and data contention are to be expected if a single random access memory, such as RAM 20 is utilized. However, even in a single CPU environment, relatively faster cache memory is still advantageously employed to accommodate a CPU whose operation rate is substantially faster than the data access time to be expected from convention RAM. Basic multiprocessor computer techniques, memory hierarchy techniques, as well as shared variable data integrity maintenance schemes associated with multi-processor systems, are well within the understanding of one of ordinary skill in the art.

The computer system A of FIG. 1 also employs an input/output ("I/O") unit 26. The I/O unit 26 is advantageously placed in data communication with the CPU 10, as well as the virtual memory system 18, via the bus system 24. The I/O unit 26 accomplishes interface with humans or other data devices as will also be appreciated by one of ordinary skill in the art.

Stored within address the addressable or accessible space of CPU 10 provided by virtual memory 18 is data representative of a plurality of case records 28a through 28n. Each case record 28 includes data representative of one or more case record variables ("CRV") illustrated as 30a through 30n. The case records 28 represent a grouping of data about which knowledge is extracted in the subject system. Also disposed in virtual memory system 18 is data directive of the data parsing and knowledge tree formation accomplished by the present system and illustrated in FIGS. 2–4.

Figure 2:
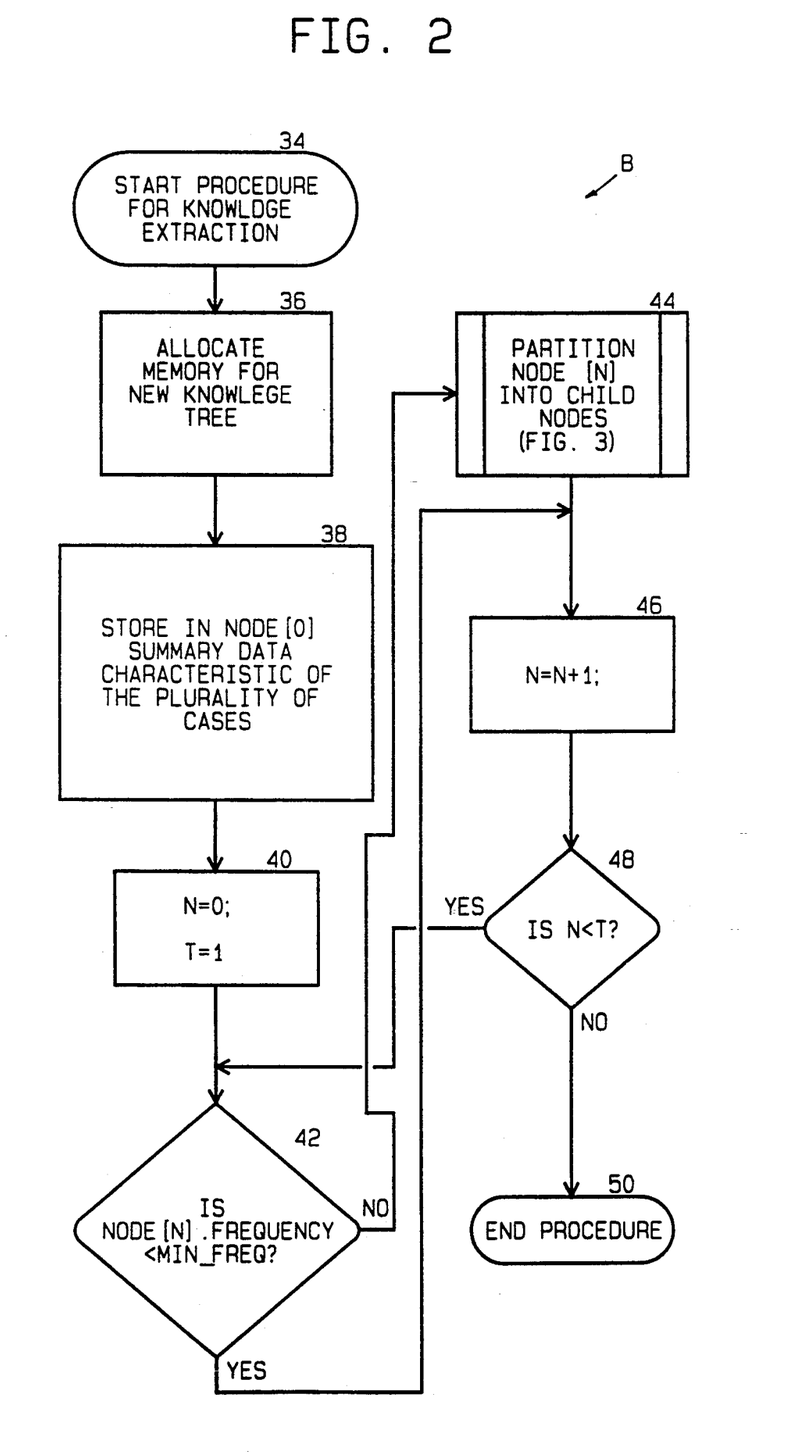
FIG. 2 illustrates, in flow chart form, an overall system for knowledge extraction of the subject invention.

Turning now to FIG. 2, the knowledge parsing system accomplished by the subject system will be described with particularity. The parsing routine B is accomplished by a series of hierarchical directives and conditional responses which are advantageously stored in random access memory 20 of FIG. 1. The parsing or knowledge extraction routine B is commenced at block 34. In block 36, allocation and clearing of a suitable area of memory for formation of a knowledge tree within virtual memory 18 (FIG. 1) is accomplished. In the subject description, it is assumed that memory is allocated as a one-dimensional array of node structures. This assumption is solely for clarity of explanation and is not necessary for practicing the following teachings. It will be appreciated that linked lists are also suited for storage of the subject knowledge tree.

The present parsing routine B employs several variables which have been provided in "C" language conventions. In the preferred implementation, the node structure variables are declared as follows:

| integer | parent, | /*index of parent node |
| | leftmost_child, | /*index of first child node |
| | right_sibling, | /*index of next sibling node |
| | level, | /*number of ancestor nodes |
| | frequency; | /*number of included cases |
| binary array | cluster, | /*identifies the included cases |
| | distribution; | /*characterizes known qualities |
| real array | range; | /*characterizes known quantities |

In block 38, the CPU assigns values to all structure variables of node[0], the root node of the new knowledge tree. The following assignments are standard.

| node[0].parent = −1; | /*the root never has a parent |
| node[0].leftmost_child = −1; | /*the root initially has no child |
| node[0].right_sibling = −1; | /*the root never has a sibling |
| node[0].level = 0; | /*the root always is at level 0 |

The remaining assignments require computation. The value of node[0].frequency is computed as the number of cases included in the root cluster. The value of node[0].cluster[C] is computer as TRUE or FALSE depending on whether the Cth case of the database is included in the root cluster. The value of node[0].distribution[S][U][V] is computed as TRUE or FALSE depending on whether the Vth possible value of the Uth unrankable (qualitative) case-record variable is known to occur in at least one of the Sth sequentially indexed case records of the included cases. Finally the two-component real vector node[0].range[S][R] is computed as the known maximum and minimum values of the Rth rankable (quantitative) case-record variable of the Sth sequentially indexed case records of the included cases.

Following the assignment of data values to the root node, block 40 initializes the local variables N and T. In general, the value of N specifies the index of the node whose assigned cases are next to be partitioned; therefore, N is initially set to zero representing that the cases assigned to the root node will be partitioned first. In general, the value of T specifies the total number of nodes that have already been assigned cases; therefore, T is initially set to one representing that at this point only the root node has been assigned cases.

Progressing to the block 42, a test is performed to determine whether the number of cases assigned to node[N] is large enough to justify partitioning the cases. In the preferred embodiment, the user-defined value of min_freq specifies the minimum acceptable value of node[N].frequency. The value of min_freq is advantageously set at least to three insofar as no fewer than three cases are meaningfully partitionable. A negative test result at block 42 allows for avoiding block 44 without attempting to partition the cases.

Block 44, which is achieved only when the test of block 42 is positive, serves to partition the cases assigned to node[N], extracting clusters of cases which are subsequently assigned to child nodes of node[N]. The partitioning procedure, which also serves to increment the value of T when newly extracted clusters are assigned to child nodes, will be described in greater detail further below. Upon completion of the partitioning procedure, progress is made to block 46, which block is also achieved in the event of a negative result from the test of block 42.

Block 46 serves to increment the node index N, in preparation for a partitioning of the next node of the knowledge tree.

Progressing to block 48, a test is performed to determine whether any cases have been assigned to node[N]. A positive test result causes regression back to block 42, while a negative test result represents completion of the knowledge tree formation as is achieved at block 50.

Figure 3:
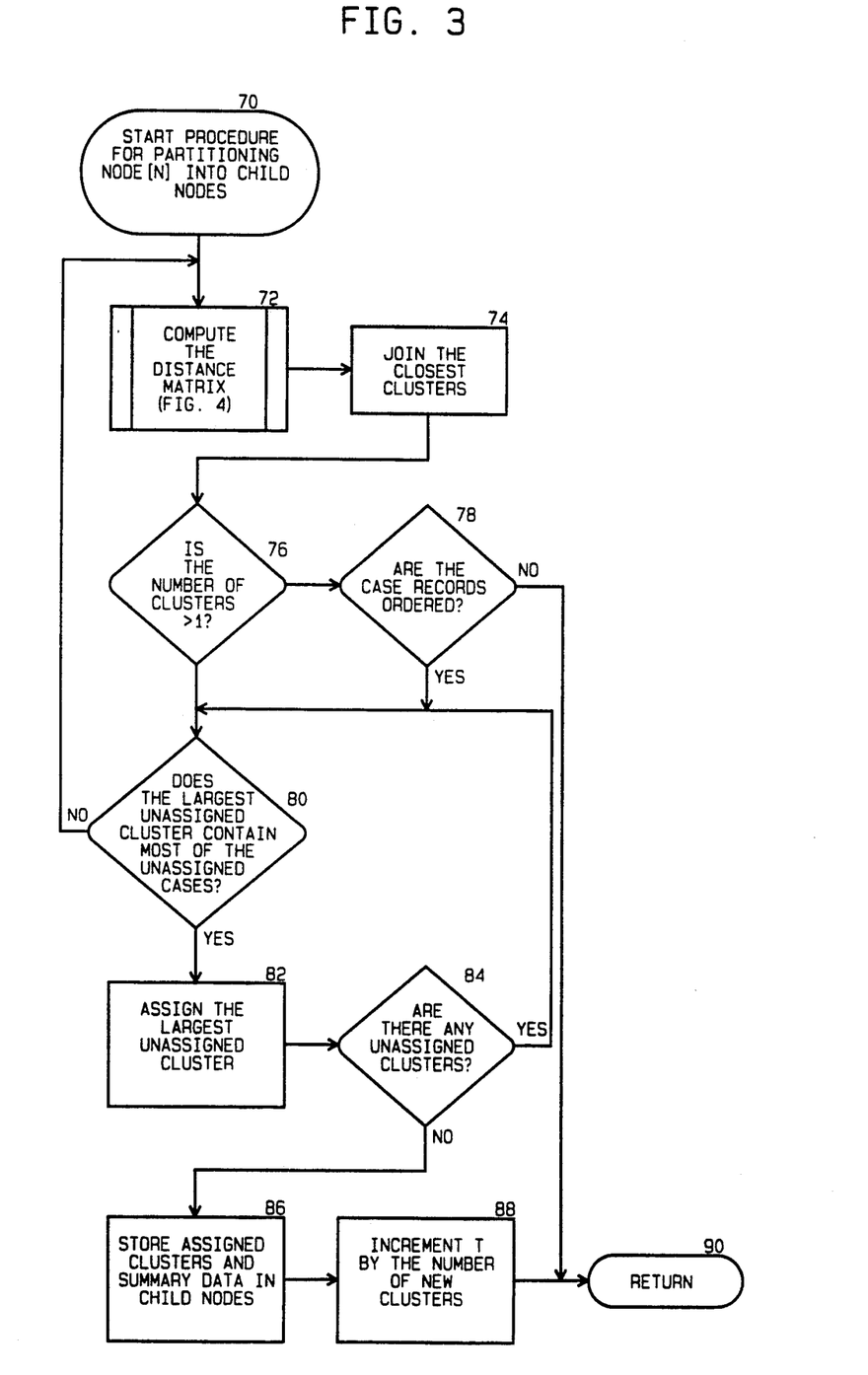
FIG. 3 illustrates, in detailed flow chart form, the block of partitioning a node [N] into child nodes of FIG. 2.

Turning now to FIG. 3, the partitioning procedure provided at block 44 of FIG. 2 will be described in detail. After commencing the procedure at block 70, the system progresses to block 72, at which point a distance matrix is computed for all pairs of cases assigned to node[N]. The particulars associated with computation of this distance matrix will be described further below.

After computation of the distance matrix in block 72, block 74 employs the CPU to join the closest clusters of cases assigned to node[N], thereby reducing the number of clusters and increasing the size of some clusters. Initially, every assigned case is treated as a cluster of one. Within block 74, the distance between two clusters is evaluated as the maximum distance between a case in one and a case in the other. In the preferred implementation, the results of joining are independent of the order in which the closest clusters are joined. For example, under the condition that the distance between the closest clusters, C1 and C2, equals the distance between clusters C2 and C3, the preferred implementation always joins C1, C2, and C3 into one cluster regardless of the distance between C1 and C3.

After block 74 has joined the closest clusters, the system progresses to block 76, at which point a test is performed to determine whether a plurality of clusters is present. A negative test result represents that the partitioning procedure has failed to produce distinct clusters and causes the system to digress to block 78, at which point a test is performed to determine whether the case records are sequentially ordered. A positive test result at block 78 represents that different case records will be used to partition the cluster at the next level of the knowledge tree and therefore causes the system to progress to block 80, which block is also achieved in the event of the positive result from the test of block 76. A negative test result at block 78 represents a final failure of partitioning and causes the system to achieve block 90 for termination of the partitioning procedure.

Block 80 serves to test whether the largest unassigned cluster contains most of the unassigned cases. Initially, all cases (clusters) are unassigned. A negative test result at block 80 causes regression back to block 72, while a positive test result allows the system to progress to block 82.

Block 82 serves to assign the largest unassigned cluster. In the preferred implementation, all unassigned clusters are stored in random access memory 20 as a linked list and block 82 serves to remove the largest unassigned cluster from the linked list of unassigned clusters and to append it to the end of a linked list of assigned clusters, also stored in random access memory 20. A further aspect of the preferred implementation is that the joining process of block 74 removes from both lists all but the largest of the clusters that it joins into one cluster.

The system then progresses to block 84, at which point the CPU performs a test to determine whether any unassigned cases remain. In the preferred implementation, this test determines whether the linked list of unassigned clusters is not empty. A .positive test result causes regression back to block 80, while a negative test result allows progression to block 86.

Block 86, which block is reached only after all clusters have been assigned, serves further to assign all clusters and associated summary data to child nodes. Summary data is computed for each cluster by means described above for block 38. In the preferred implementation, block 86 serves to store the linked list of assigned clusters as a linked list of child nodes. More particularly, the largest (first) cluster is stored in node[T] as the leftmost (first) child of node[N], the parent node; the next largest (second) cluster is stored in node[T+1] as the right sibling of the leftmost child node; and so forth. The degree of exceptionality of a child node and its assigned cluster is uniquely defined as the number of lower indexed sibling nodes. The conceptual meaning of a child node having a degree of exceptionality D is that its assigned cluster is typical of those cases that are known to be contained by the cluster assigned to the parent node but are also known not to be contained by any of the clusters assigned to child nodes that have degrees of exceptionality less than D.

The system then progresses to block 88, at which point the value of T is incremented to reflect the assignment of new clusters to child nodes. Block 88 is avoided if and only if the test results of blocks 76 and 78 are both negative.

The system then achieves block 90, representative of completion of the partitioning procedure.

Figure 4:
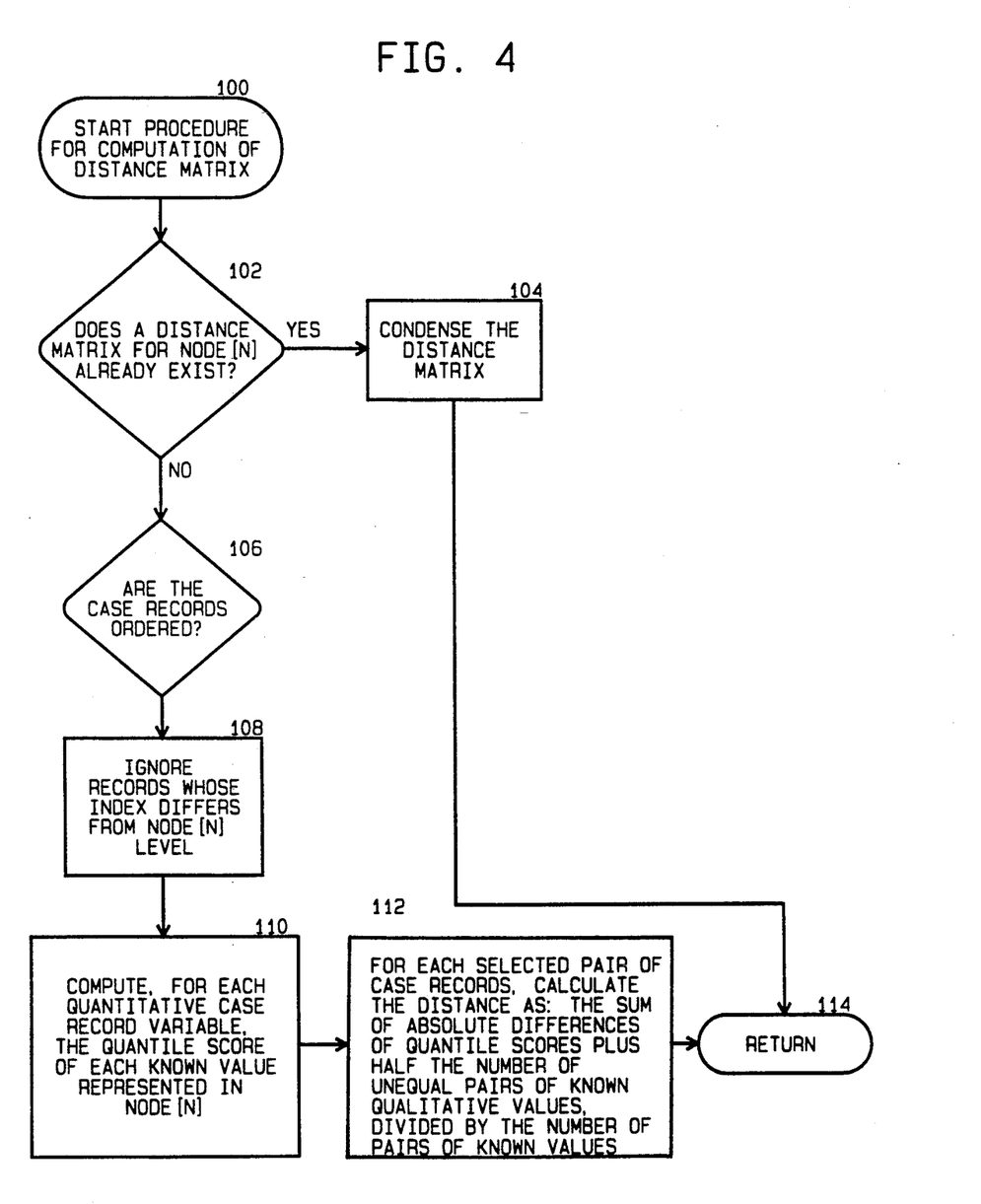
FIG. 4 illustrates in detailed flow chart form, the block of computation of a distance matrix of FIG. 3; and, FIG. 5 illustrates the structure of a knowledge tree as accomplished by the system of the present invention.

Turning now to FIG. 4, distance matrix computation, evidenced at block 72 of FIG. 3, will be described in detail. The procedure is commenced at block 100 and progressed to the decision step at block 102. At block 102, a test is performed in the CPU to determine whether a distance matrix for node[N] has already been computed. A positive result causes digression to block 104, at which point the existing distance matrix is condensed into a matrix of distances between clusters, after which the procedure for distance matrix computation terminates at block 114. A negative test result at block 102 allows progression to the next decision step at block 106.

At block 106, a test is performed to determine whether individual cases contain sequentially ordered case records. A positive test result allows progression to block 108, while a negative test result provides for avoiding block 108.

In block 108, a filtering is made to filter out those case records whose index within a case differs from the tree level of node[N]. In an event case records are temporally ordered within individual cases, tree levels correspond to elapsed times. At this point, the system moves to block 110, which block is also achieved in an event of the negative test result of block 106.

At block 110, a computation is made for each quantitative case record variable. Each computation achieves a quantile score (average rank divided by total number of known values) for a different value that occurs in the selected case records.

Finally, block 112 implements computation of a distance between each pair of selected case records. Each distance is computed as the sum of the absolute differences of corresponding quantile scores plus half the number of unequal pairs of known qualitative values, divided by the total number of pairs of known values, unless there are no pairs of known values, in which case the distance is assigned a negative value representing an unknown distance. In the unlikely event of a case having no known distance to any other case in the cluster, such a case is immediately assigned and removed from the distance matrix. The computed distance values are independent of whether values of a two-valued case record variable are quantitative or qualitative, because of the relatively unknown fact that the difference between the quantile scores of the high and low values of a two-valued quantitative variable must always equal one half, regardless of the relative frequencies of the two values. Upon completion of all distance calculations the system achieves block 114, representing completion of the distance matrix computation subroutine.

Figure 5:
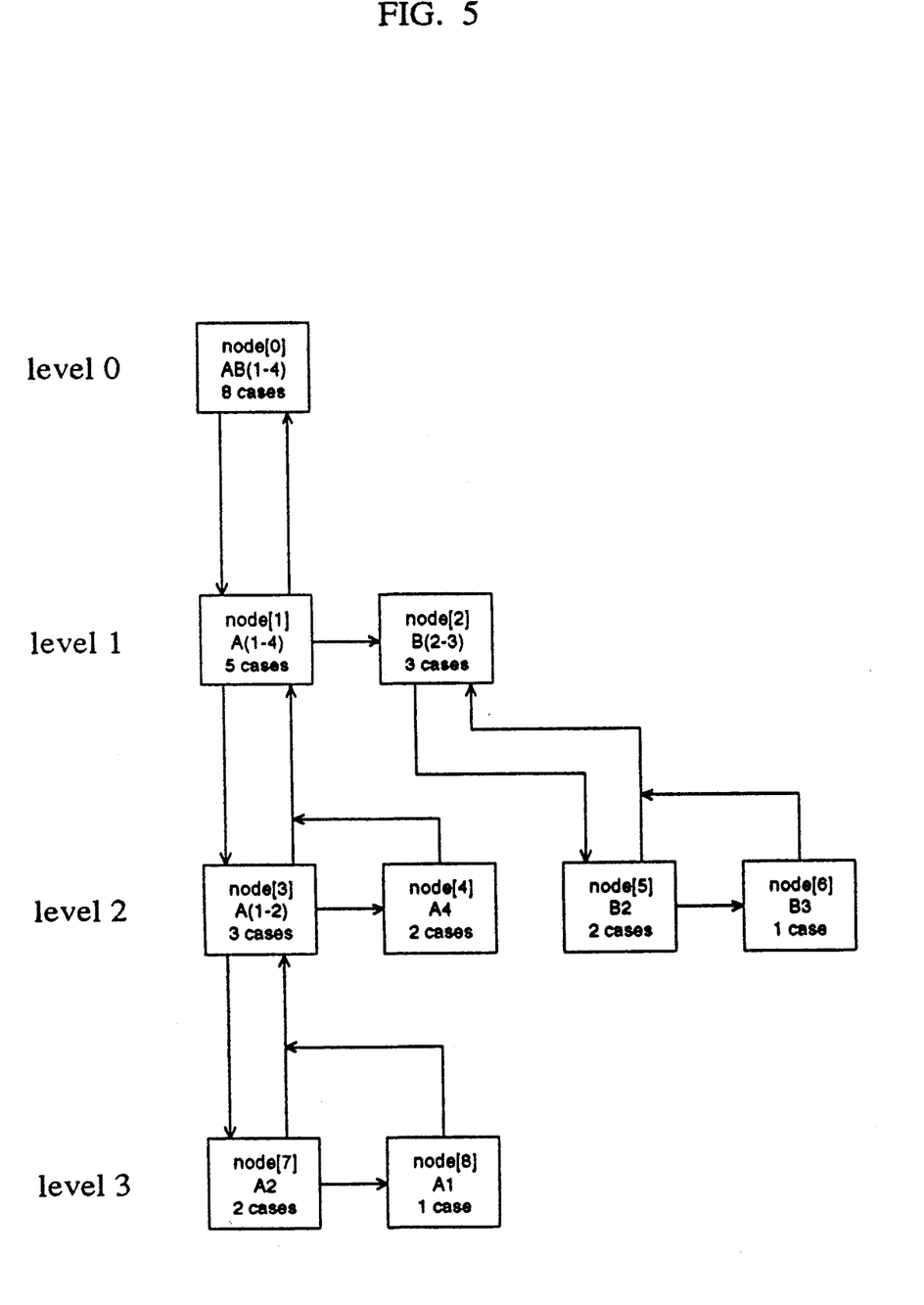

Turning now to FIG. 5, an illustration of a knowledge tree extracted by the above-described system will be described in detail. In the particular illustration of FIG. 5, the database is of eight cases and the user-defined value of min_freq, as applied in block 42, is three. As always, the root node is node[0], the leftmost child of the root node is node[1] and the level of the root node is zero. The right sibling of node[1] is node[2] but node[2] has no right sibling. In general, a parent node may have more than two child nodes, but the level of the child nodes is always one greater than the level of the parent node.

In the illustration of FIG. 5, each case contains a single record consisting of one quality and one quantity. Each illustrated node specifies the distribution and range of the known qualities and quantities contained in the case records of the cluster assigned to the node. The corresponding lists of individual case records are shown below:

| Node Index | Case Records |
|---|---|
| 0 | A1 A2 A2 A4 A4 B2 B3 |
| 1 | A1 A2 A2 A4 A4 |
| 2 | B2 B2 B3 |
| 3 | A1 A2 A2 |
| 4 | A4 A4 |
| 5 | B2 B2 |
| 6 | B3 |
| 7 | A2 A2 |
| 8 | A1 |

Next the lower half of the symmetrical distance matrix for node[0] is shown below:

|    | A1    | A2    | A4    | B2   | B3 |
|----|-------|-------|-------|------|----|
| A1 | 0     |       |       |      |    |
| A2 | 5/32  | 0     |       |      |    |
| A4 | 13/32 | 8/32  | 0     |      |    |
| B2 | 13/32 | 8/32  | 16/32 | 0    |    |
| B3 | 18/32 | 13/32 | 11/32 | 5/32 | 0  |

In general, the conceptual meaning of node[1] is that it contains the cases that are typical of the cases contained in the database. In the illustration of FIG. 5, the summary data of node[1] reveals that typical cases have quality A.

This invention has been described with reference to a preferred embodiment. Obviously, modifications and alterations will occur to others upon a reading and understanding of this specification. It is my intention to include all such modifications and alterations insofar as they come within the scope of the appended claims or the equivalents thereof.

Having thus described my invention, I claim:

1. A clustering system comprising:
   retrieval means for retrieving summary data characteristic of a plurality of case records, wherein a case record includes case record data representative of a known value of least one of a qualitative and a quantitative case record variable, and wherein the case record data is adapted to be representative of an unknown value;
   comparison means for generating comparison signals representative of a plurality of distances between case records, wherein each comparison signal is representative of a magnitude that is,
   a) an increasing function of a number of unequal pairs of corresponding known qaulitative values included in a pair of case records,
   b) an increasing function of an absolute difference between ranks of corresponding known quantitative values included in a pair of case records, and
   c) independent of whether values of a two-valued case record variable are quantitative or qualitative;
   partitioning means for selectively partitioning the plurality of case records in accordance with the comparison signals to form sibling child clusters therefrom;
   processor means for calculating summary data characteristic of each sibling child cluster; and
   storage means for storing the calculated summary data.

2. The clustering system of claim 1 wherein:
   the partitioning means includes means for selectively partitioning the plurality of case records in accordance with the comparison signals to form sibling child clusters therefrom;
   the system includes identification means for assigning a datum representative of a unique degree of exceptionality to each sibling child cluster, whereby each sibling child cluster is rendered conceptually meaningful;
   the processor means includes means for calculating summary data characteristic of each sibling child cluster; and
   the storage means includes means for storing the calculated summary data in accordance with each assigned degree of exceptionality.

3. A conceptual clustering system comprising:
   retrieval means for retrieving summary data characteristic of a plurality of case records, wherein a case record includes case record data representative of a known value of at least one of a quantitative and a qualitative case record variable, and wherein the case record data is adapted to be representative of an unknown value;
   comparison means for generating comparison signals representative of a plurality of distances between case records;
   partitioning means for selectively partitioning the plurality of case records in accordance with the comparison signals to form sibling child clusters therefrom;
   identification means for assigning a datum representative of a unique degree of exceptionality to each sibling child cluster, whereby each sibling child cluster is rendered conceptually meaningful;
   processor means for calculating summary data characteristic of each sibling child cluster; and
   storage means for storing the calculated summary data in accordance with each assigned degree of exceptionality.

4. The conceptual clustering system of claim 3 adapted for distributed conceptual clustering further comprising:
   sampling means for isolating a selected sample plurality of case records from a retrieved plurality of case records;
   the comparison means including means for generating sample comparison signals representative of a plurality of distances between case records in a sample plurality;
   the partitioning means including means for partitioning a sample plurality in accordance with the sample comparison signals to form sample sibling child clusters therefrom;
   the identification means including means for identifying, in different sample pluralities, corresponding sample sibling child clusters assigned the same degree of exceptionality, whereby each sample sibling child cluster is rendered conceptually meaningful; and
   pooling means for selectively combining the corresponding sample sibling child clusters from different sample pluralities to form sibling child clusters therefrom.

5. The conceptual clustering system of claim 3 adapted for hierarchical clustering further comprising:
feedback means for selectively communicating an Nth previously stored sibling child cluster to the retrieval means as an Nth plurality, wherein the index N is defined as a positive integer;
the comparison means including means for generating an Nth iteration comparison signal representative of a plurality of distances between case records in the Nth plurality;
the partitioning means including means for partitioning the Nth plurality in accordance with the Nth iteration comparison signals to form sibling child clusters therefrom;
the identification means including means for assigning a datum representative of a unique degree of exceptionality to each sibling child cluster in the Nth plurality, whereby each sibling child cluster is rendered conceptually meaningful;
the processor means including means for calculating summary data characteristic of each sibling child cluster in the Nth plurality; and
the storage means including means for storing the calculated summary data in child nodes of the Nth node of a knowledge tree in accordance with assigned degrees of exceptionality.

6. The conceptual clustering system of claim 5 adapted for ordered hierarchical conceptual clustering wherein the comparison means includes selection means for selecting case records from the Nth plurality in accordance with an ordering of case records within individual cases and in accordance with a level of the Nth node within the knowledge tree.

7. The conceptual clustering system of claim 3 adapted for pattern classification wherein the processor means includes means for calculating the summary data as cluster data representative of the case records in each sibling child cluster and at least one of a range data representative of a range of known values of a quantitative case record variable and distribution data representative of the set of known values of a qualitative case record variable.

8. A method for parsing of data with a digital signal processing system including random access memory, secondary data storage, and a data processor including an arithmetic logic unit, comprising the steps of:
(a) storing, in at least one of the random access memory and the secondary data storage, summary data representative of a plurality of case records wherein each case record includes case record data representative of a known value of at least one of a quantitative and a qualitative case record variable, and wherein each case record is adapted to be representative of an unknown value;
(b) generating, in the data processor, comparison signals representative of a plurality of distances between case records in accordance with the stored case record data;
(c) generating, in the data processor, data sets representative of a partitioning of the stored database in accordance with generated comparison signals;
(d) calculating, in the data processor, data representative of a relative, unique degree of exceptionality for each data set generated in step (c);
(e) calculating, in the data processor, summary data characteristic of each data set generated in step (c): and
(f) storing, in at least one of the random access memory and the secondary data storage, the calculated summary data in accordance with at least one calculated degree of exceptionality.

9. The method of claim 8 further comprising, after step (f), a step (g) comprising recursively applying steps (b) through (g) to selected data sets stored in step (f).

10. The method of claim 8 wherein step (b) includes the step of generating the comparison signals as signals valued as representative of:
a) an increasing function of a number of unequal pairs of corresponding known qualitative values included in a pair of case records;
b) an increasing function of an absolute difference between ranks of corresponding known quantitative values included in a pair of case records; and
c) independent of whether values of a twovalued case record variable are quantitative or qualitative.

* * * * *

UNITED STATES PATENT AND TRADEMARK OFFICE
CERTIFICATE OF CORRECTION

PATENT NO. : 5,325,466
DATED : June 28, 1994
INVENTOR(S) : Karl Kornacker

Page 1 of 3

It is certified that error appears in the above-indentified patent and that said Letters Patent is hereby corrected as shown below:

The drawing sheets, consisting of Figs. 3 and 4, should be deleted to be replaced with the drawing sheets, consisting of Figs. 3 and 4, as shown on the attached pages.

Signed and Sealed this

Twenty-seventh Day of December, 1994

Attest:

BRUCE LEHMAN

Attesting Officer

Commissioner of Patents and Trademarks

FIG. 3